UNITED STATES PATENT OFFICE.

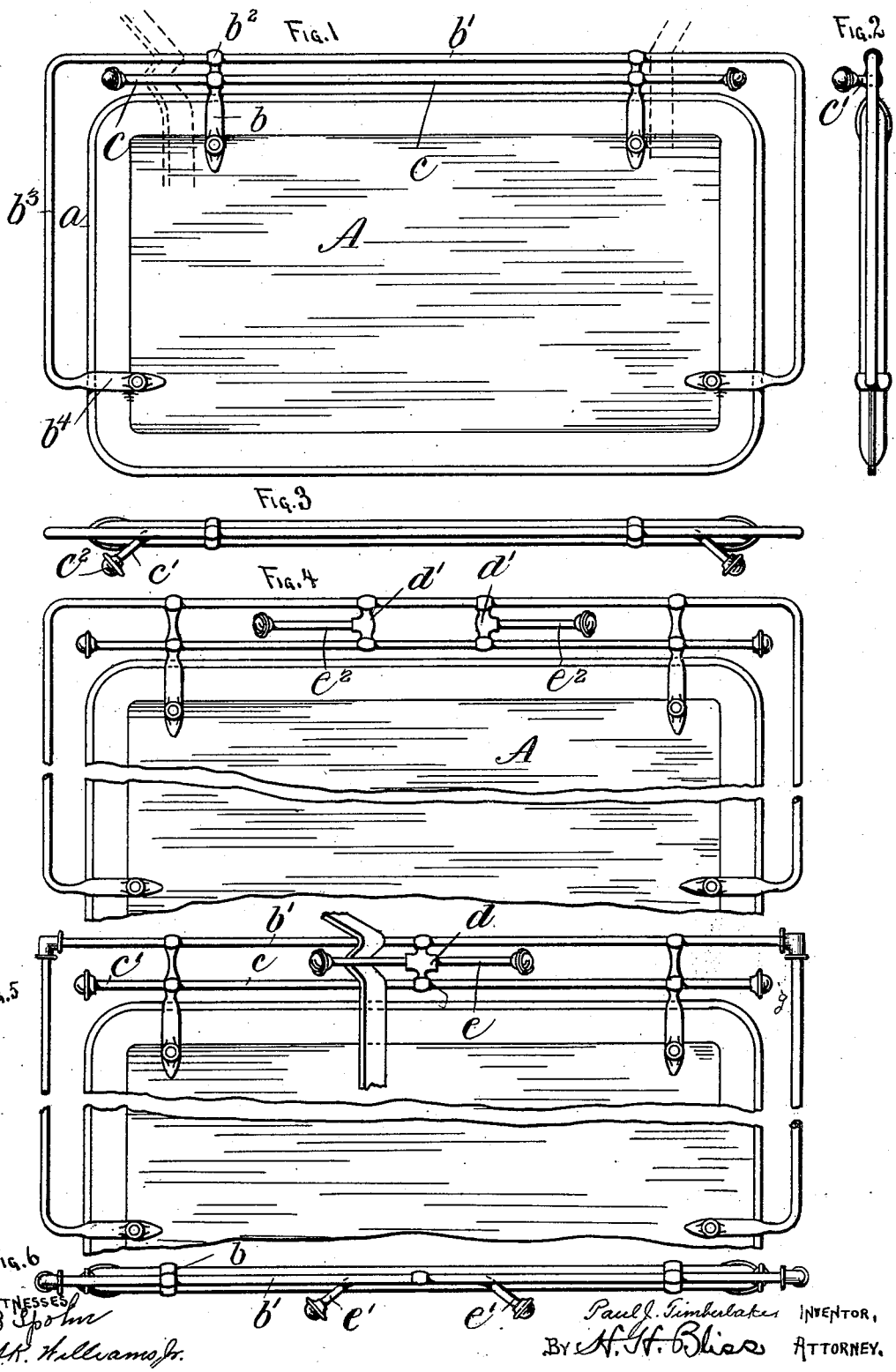

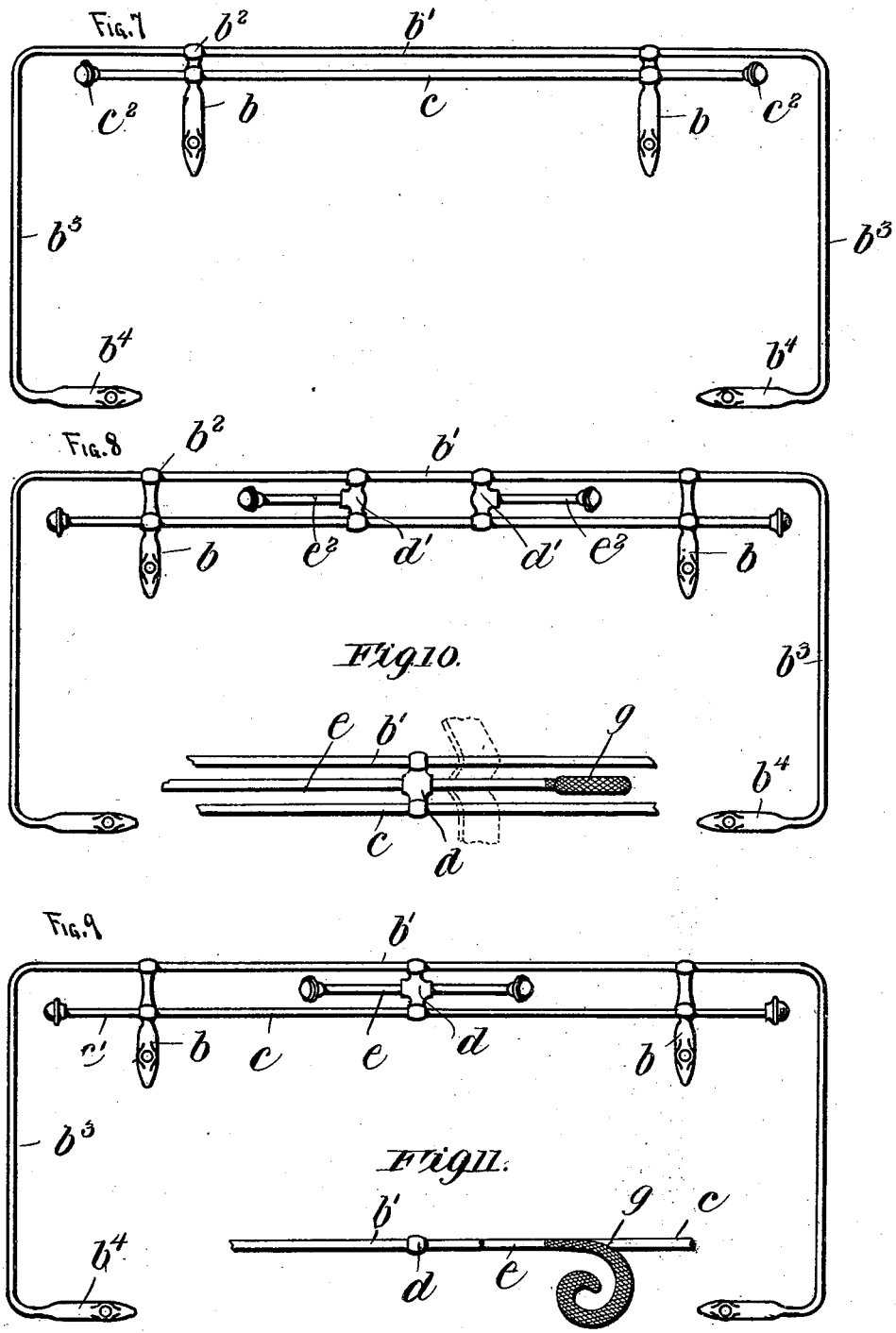

PAUL J. TIMBERLAKE, OF JACKSON, MICHIGAN.

VEHICLE-DASHBOARD FRAME.

SPECIFICATION forming part of Letters Patent No. 692,946, dated February 11, 1902.

Original application filed November 17, 1900, Serial No. 36,834. Divided and this application filed June 17, 1901. Serial No. 64,903. (No model.)

*To all whom it may concern:*

Be it known that I, PAUL J. TIMBERLAKE, a citizen of the United States, residing at Jackson, in the county of Jackson and State of Michigan, have invented certain new and useful Improvements in Vehicle-Dashboard Frames, of which the following is a specification, reference being had therein to the accompanying drawings.

This present invention relates to a device to be attached to the dashboards of vehicles, and which operates to strengthen and brace the same and also to provide a rein-holder; and it is, as to that form of the invention shown in Figures 5 and 6, a division of my application for patent, Serial No. 36,834, filed November 17, 1900.

In the accompanying drawings, Fig. 1 is an elevation of one form of my invention, it being here illustrated as seen when looking forward from the vehicle. Fig. 2 is a side elevation of the same. Fig. 3 is a top plan view. Fig. 4 is an elevation of another form of the invention. Fig. 5 is an elevation, and Fig. 6 is a top plan view of still another form of the invention. Figs. 7, 8, and 9 are views illustrating the several forms of the article shown, respectively, in Figs. 1, 4, and 5, they being here illustrated detached and in the condition in which they are manufactured as separate articles prior to their attachment to the dashes. Figs. 10 and 11 illustrate modifications.

In the drawings, A indicates the dashboard of a buggy or similar vehicle. This is formed, as is usual, with a surrounding stiffened edge $a$.

As shown in Figs. 7, 8, and 9, the attachment which constitutes the present invention is a complete article of manufacture and is intended to be sold in condition ready for immediate attachment to the dashboard of a vehicle. It comprises the standards $b$ and a cross bar or rail $b'$. The standards $b$ are provided with eyes $b^2$, through which the rail is passed and in which it is secured by brazing or equivalent process. The rail extends across the top of the dash and from side to side, and its end portions are preferably extended downward along the side edges of the dashboard, constituting the vertical portions $b^3$, which are adapted to serve as hand-rails to assist in entering and descending from the vehicle. The side vertical rails or parts of the cross-bar are secured to the dash by foot-pieces $b^4$ or by any other suitable means. The cross-rod $b'$, arranged and supported as shown, operates to brace and strengthen the dash; but in order to further strengthen the dash I provide a supplemental cross-bar $c$, which is arranged parallel with the cross-bar $b'$ and is situated between it and the top of the dash, the said supplemental bar being supported by the standards $b$. The ends of the supplemental cross-bar $c$ are free or unsupported, extending outward in opposite directions beyond the standards $b$. These outer ends are preferably turned or bent backward, as represented at $c'$, (see particularly Figs. 2 and 3,) and they may be and preferably are provided at their ends with balls or knobs $c^2$, which are for the purpose of improving the appearance of the article and also preventing the clothing from catching upon the projecting ends of the said bar.

As described in my aforesaid application, when the parts of a dash-rail frame are constructed and arranged as described and as illustrated in the figures of the drawings hereof it serves not only to strengthen the dash, but also constitutes a rein-holder, the rein (indicated in dotted lines, Fig. 1) being passed between the cross-bar $b$ and the end portion of the supplemental cross-bar $c$ and thence between the bar $c$ and the top of the dash. The reason for bending or turning the end $c'$ of the bar rearward is to facilitate the entrance of the reins in position to be held by the parts of the dash-frame. By arranging the supplemental cross-bar $c$ in the manner described I provide two rein-holders, which are arranged near the outer edges or sides of the dash, in which position it is often desirable to support the rein as distinguished from supporting it at the center of the dash. It is, however, desirable under some circumstances to provide the dash-rail frame with a rein-holding attachment located near the center of the frame, and in Fig. 5 such an arrangement is shown. In this form of my invention the main cross-bar of the attachment is indicated by $b'$ and the supplemental stiffening cross-bar by c. These two bars are connected at their centers by a bracket d, provided with eyes, through which the bars b' and c pass and in which they are secured. In this bracket d there is mounted a third bar e, which is relatively short and the ends of which extend in opposite directions and are free and bent or turned inward, as indicated at c', Fig. 6. As shown in Fig. 5, the bars b', e, and c constitute a rein-holding device situated at the center of the frame. When the frame is thus constructed, the driver may use either the rein-holder situated over the center of the dash or a rein-holder situated over one or the other side or edge thereof, as he may prefer.

In Fig. 4 there is shown a form of the invention differing somewhat from that illustrated in Fig. 5 in that there are two brackets d' d' connecting the cross-bars b' and c, and each of these brackets supports a third bar $e^2$. In a construction like that shown in Fig. 4 the rein-holders formed by the parts $e^2$ are not so near the center of the dash as in the construction shown in Fig. 5.

By reference to Fig. 1 it will be seen that the rein is held between the free end of the supplemental cross-bar c and the top edge of the dash, the bar c being arranged so close thereto as to cause a sharp bend or bight to be formed in the rein.

While for convenience of manipulation it is desirable that the free ends of the supplemental bars which constitute parts of the rein-holding feature of the attachment should be bent or turned rearward, this is not essential, as may be seen by reference to Figs. 5 and 6, where the free ends c' of the supplemental bar c are directly below or in the vertical plane of the bar b'. When the parts are thus arranged, it is important that there should be a relatively large free or open space opposite the end of the said bar in order that the reins may be freely slipped over the end of the bar and into the spaces between the parallel surfaces which operate to hold the rein. Such an open space is represented at g in Fig. 5. This space should be greater than the distance between the face of the bar c and the top edge of the dash—that is, than the distance between those two parallel edges of the rein-holding attachment which grip and hold the reins. It is desirable that the free space at the free end of the bar c should be inclosed, and in Fig. 5 the main bar of the frame constitutes a part closing the space g. The inclosing of the free space g by the main bar of the frame is not essential, however, and in a form of the invention lacking the vertical side bars $b^3$ the free space would be uninclosed.

The form of the protecting enlargements at the free ends of the bars or arms which constitute the rein-holders may be different from that shown, and in Figs. 10 and 11 I have shown a form of such enlargement of scroll or volute shape. Such an enlargement not only adds to the artistic appearance of the frame and protects the end of the bar to which it is attached, but also operates to prevent the rein from slipping or being accidentally withdrawn from the rein-holder and also facilitates the inserting and withdrawing of the rein.

What I claim is—

1. A rail-frame for a vehicle-dash having a bracing-rail extending across the top of the dash, means for attaching it to the dash, and a rein-holder secured to the said frame independent of the dash and arranged near the end of the frame and over the side or edge portion of the dash, substantially as set forth.

2. A rail-frame for a vehicle-dash having a bracing-rail arranged to be attached to the dash at a distance therefrom and extending across its top, means for attaching the rail to the dash, and a supplemental bar connected with the said rail and arranged to lie between it and the top of the dash, the ends of the said supplemental bar being free and arranged to constitute, in combination with the cross-rail, a rein-holder, substantially as set forth.

3. A rail-frame for a vehicle-dash having a bracing-rail arranged to extend across the top of a dash at a distance therefrom and having its ends extending downward to constitute substantially vertically disposed hand-rails, means for securing the said bar or rail to the dash, and a supplemental bar connected with the said cross bar or rail and arranged between it and the top of the dash, the ends of the said supplemental bar being free and terminating inside of the said vertical hand-rails, and arranged to constitute rein-holders, substantially as set forth.

4. A rail-frame for a vehicle-dash having the standards b b arranged to be secured to the dash, a cross-bar c supported in the standards and arranged to extend across the top of the dash, the ends of the cross-bar being free, and another cross bar or rail b' supported by the said standards above the cross-bar c, the ends of the said cross-bar b' being continued around outside of the free ends of the bar c, the free ends of the bar c being arranged to clamp and hold the rein, substantially as set forth.

5. A rail-frame for a vehicle-dash, comprising standards or brackets for attachment to the dash, a supplemental cross-bar c supported therein and having its ends free, a cross-bar b' supported adjacent to the bar c, and attachments at the free ends of the bar c and coöperating therewith to constitute rein-holders, substantially as set forth.

6. A rail-frame for a vehicle-dash having a strengthening-rail extending across the top of the dash, means for attaching it to the dash, a supplemental cross-bar connected with the said strengthening cross-bar and arranged between it and the top of the dash, and the supplemental bar having free ends arranged to constitute rein-holders at the sides of the frame, and a rein-holder attachment situated near the center of the frame, substantially as set forth.

7. A rail-frame for a vehicle-dash having a strengthening-rail adapted to be attached to the dash at a distance therefrom and extending across its top, means for attaching it to the dash, a supplemental bar substantially parallel with the said strengthening-bar, and having its ends free and provided with enlarged attachments, the said free ends of the bar and their attachments constituting, in combination with the strengthening-bar, holders for the reins, substantially as set forth.

8. In a rail-frame for a vehicle-dash, the combination of brackets or standards $b$, a strengthening cross bar or rail $b'$ supported in the said brackets or standards and having its ends extending downward to constitute hand-rails $b^3$, the supplemental cross-bar $c$, a bracket connecting the said cross-bars near the center of the frame, and oppositely-extending arms or bars extending from the said bracket and arranged between the cross-bars $b'$, $c$ to clamp and hold a rein, substantially as set forth.

In testimony whereof I affix my signature in presence of two witnesses.

PAUL J. TIMBERLAKE.

Witnesses:
N. CURTIS LAMMOND,
A. K. WILLIAMS, Jr.